United States Patent [19]

Nicholson

[11] Patent Number: 6,131,915
[45] Date of Patent: *Oct. 17, 2000

[54] SEAL

[75] Inventor: Terence Peter Nicholson, Hexham, United Kingdom

[73] Assignee: Specialist Sealing Limited, St. Helier, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,851

[22] Filed: Nov. 1, 1996

[30] Foreign Application Priority Data

Nov. 7, 1995 [GB] United Kingdom ............... 9522785
Oct. 4, 1996 [GB] United Kingdom ............... 9620754

[51] Int. Cl.$^7$ ..................................................... F16J 15/08
[52] U.S. Cl. ........................... 277/593; 277/595; 277/612
[58] Field of Search .................................. 277/593, 594, 277/595, 612

[56] References Cited

U.S. PATENT DOCUMENTS

| | | | |
|---|---|---|---|
| 4,976,445 | 12/1990 | Udagawa . | |
| 5,076,595 | 12/1991 | Udagawa | 277/595 |
| 5,544,899 | 8/1996 | Ueta | 277/595 |
| 5,551,709 | 9/1996 | Plunkett . | |
| 5,560,623 | 10/1996 | Yoshino | 277/595 |
| 5,568,932 | 10/1996 | Tanaka et al. | 277/595 |
| 5,669,615 | 9/1997 | Höhe et al. | 277/595 |

FOREIGN PATENT DOCUMENTS

| | | |
|---|---|---|
| 0492809 | 7/1992 | European Pat. Off. . |
| 1260236 | 1/1972 | United Kingdom . |
| 2150989 | 7/1985 | United Kingdom . |
| 2218756 | 11/1989 | United Kingdom . |
| 2221731 | 2/1990 | United Kingdom . |
| 2226371 | 6/1990 | United Kingdom . |
| 9212365 | 7/1992 | WIPO . |

*Primary Examiner*—Anthony Knight
*Assistant Examiner*—John L. Beres
*Attorney, Agent, or Firm*—Gottlieb, Rackman & Reisman

[57] ABSTRACT

A seal 2 for sealing between two opposed and generally parallel surfaces, comprising a support layer 10 for location between the said opposed surfaces and a pair of sealing layers 6, 8 supported on the support layer 10 and projecting beyond an edge 2 of the support layer 10 for effecting a seal between the said opposed surfaces when the said seal 2 is located therebetween.

43 Claims, 7 Drawing Sheets

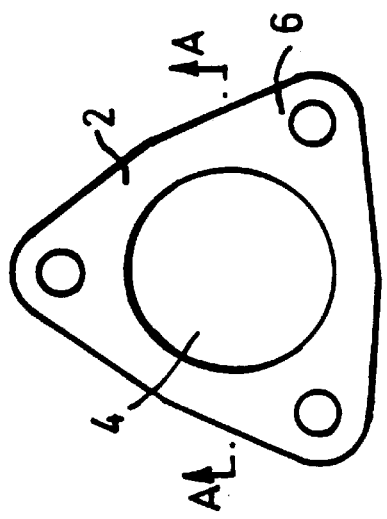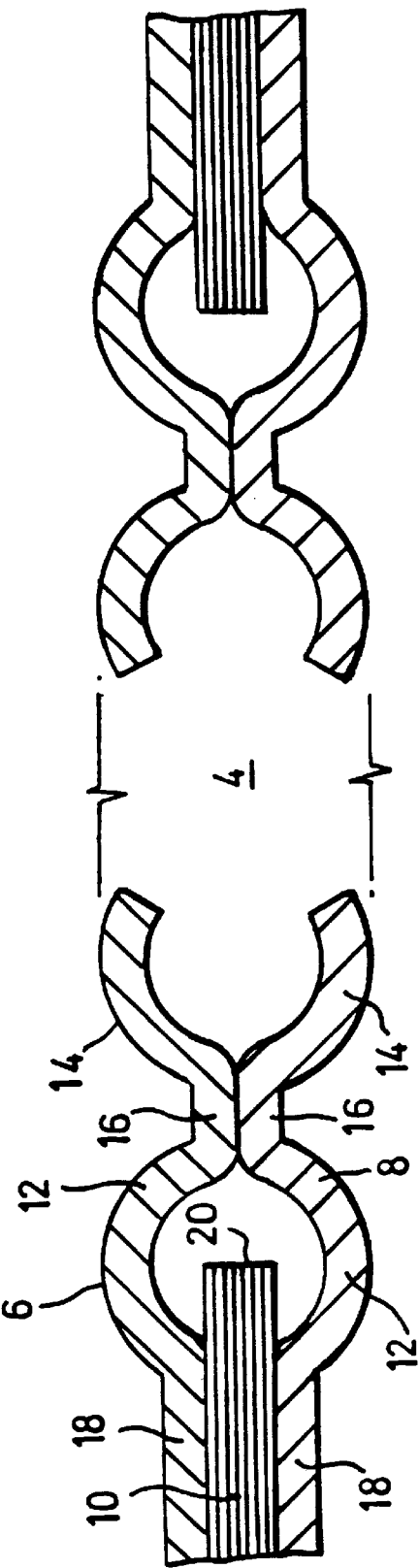
FIG.1
FIG.2

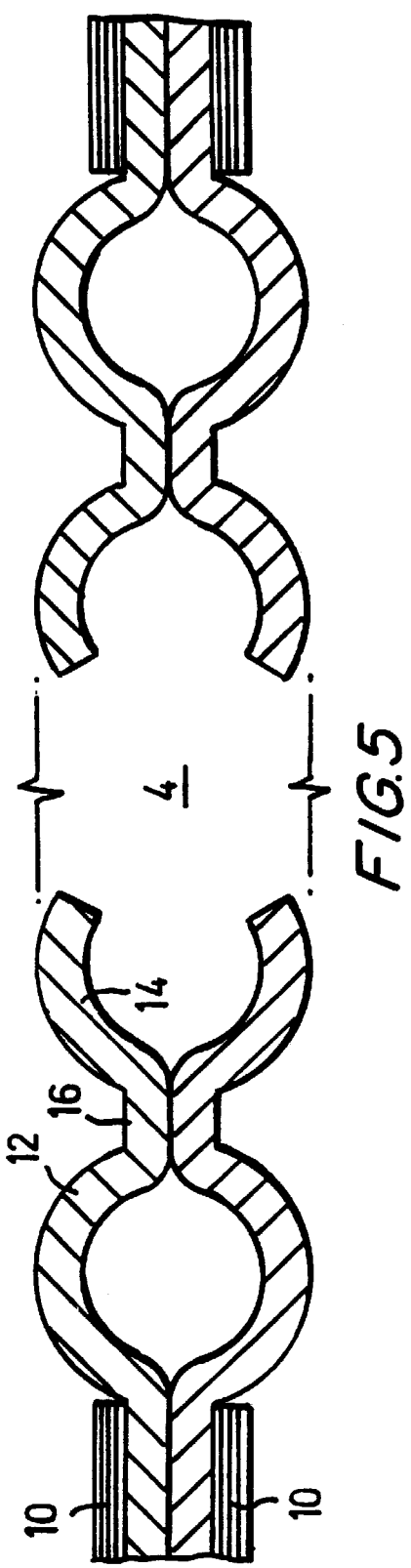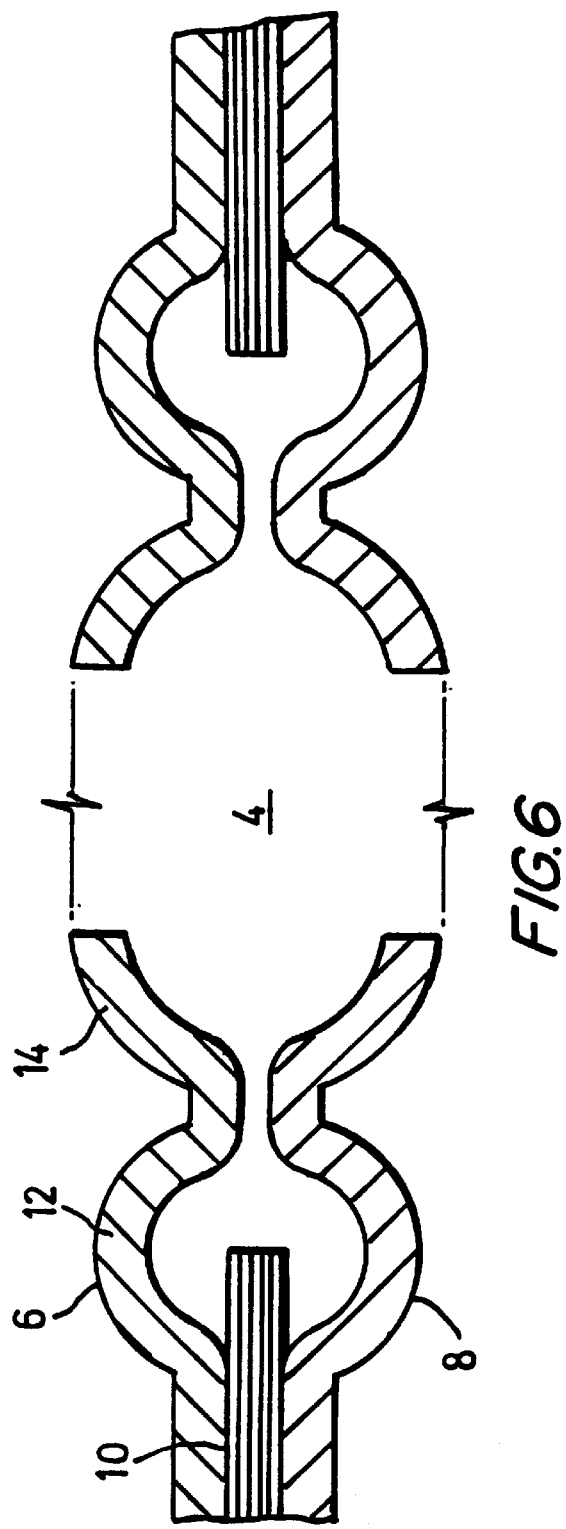

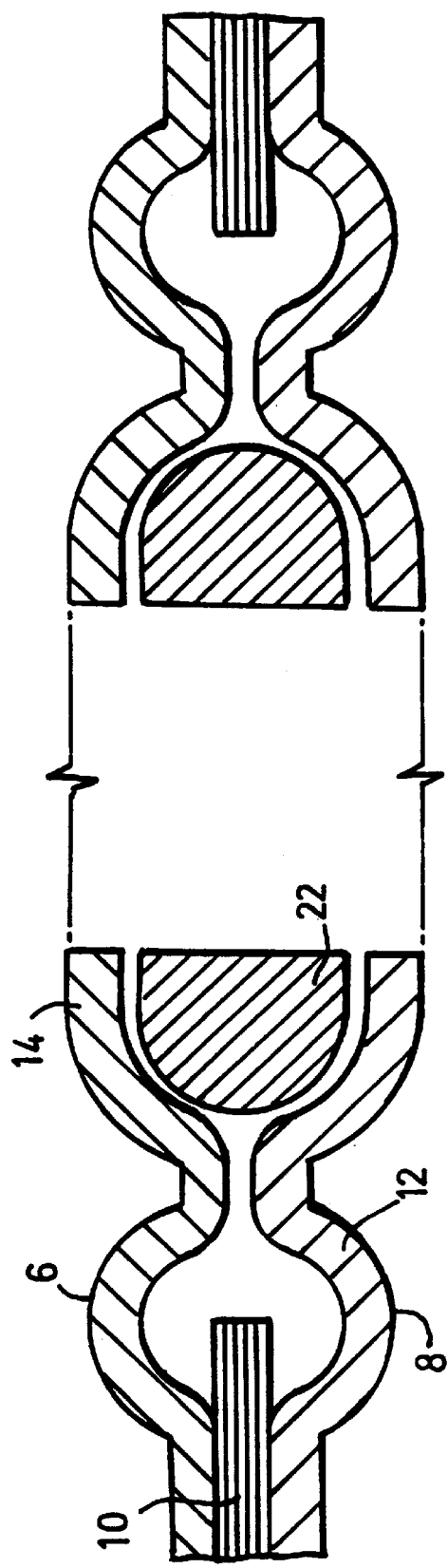
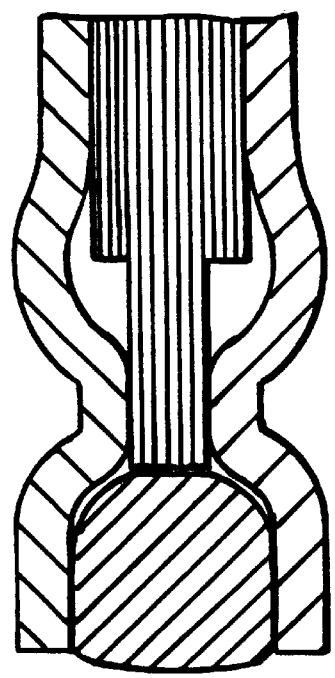
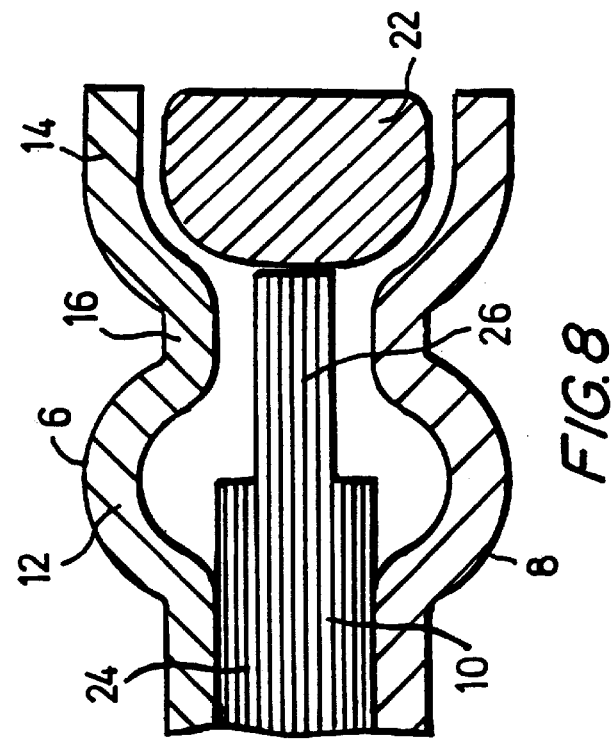

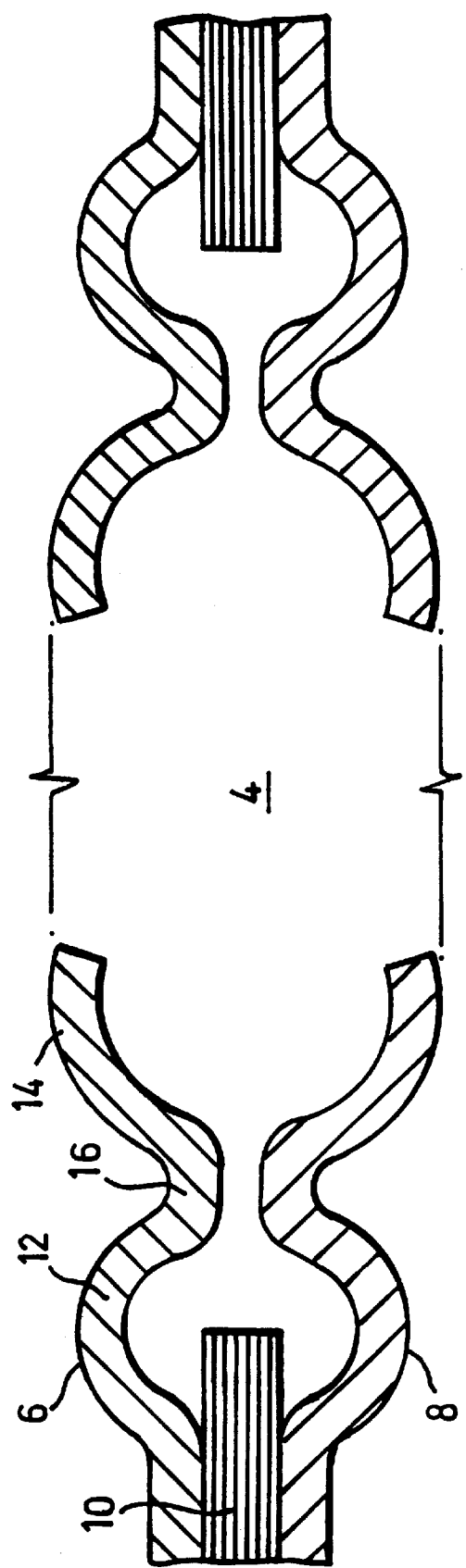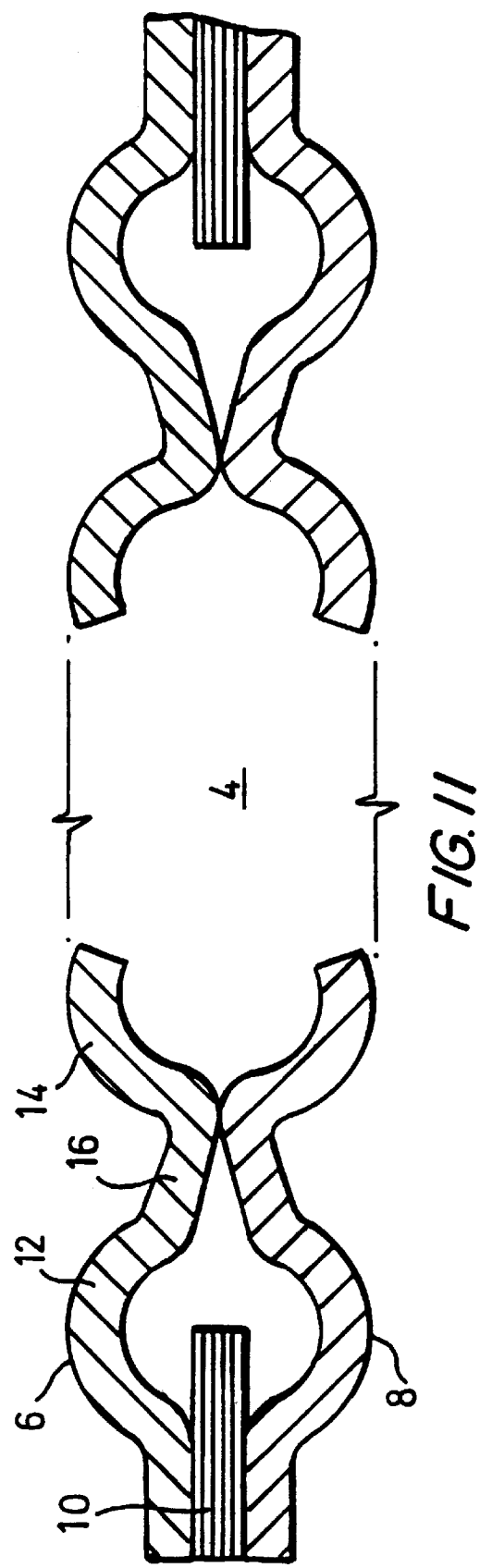

SEAL

FIELD OF THE INVENTION

The present invention relates to a seal. More particularly, the invention relates to a seal for sealing between two generally parallel surfaces; for example, such as for establishing a leak-proof seal between the cylinder head and cylinder block of a petrol or diesel engine. Further applications include the sealing of gases between inlet/exhaust manifolds and applications in pumps and valves.

The art of sealing pressurised fluid, (e.g. gas and oil) apertures has been addressed by the use of corrugations embossed in relatively thin sheet metal around the apertures to be sealed. Such seals date back as far as circa 1930. The presence of these corrugations enables the clamping load to be concentrated into closely defined areas. This is known as "high unit loading". Consequently, when the cylinder head and blocks are clamped together, high pressure contact sealing areas around the apertures to be sealed are created.

Various forms of corrugations have been developed. These incorporate both single and multi-layer combinations, examples of which are shown in FIGS. 14, 15 and 16. These seals have proven extremely successful for many years. However, they all rely upon crushing of the corrugations in order to effect the seal. As a consequence, such seals suffer from a lack of flexibility and seal recovery when released from their clamping load. Furthermore these seals do not have adequate sealing properties for many of today's engines—where there is an ever-increasing demand for increases in power output and a constant decrease in pollution.

The present invention sets out to overcome the above-mentioned problems whilst ensuring that the seal is relatively easy to handle and install. In particular, the invention sets out to provide a highly flexible seal which can cope with the differential expansions between, for example, the cylinder head and manifold of an engine. In addition, the invention sets out to provide a seal which has a good recovery factor, and which will not result in galling or other damage to sealing surfaces.

BRIEF SUMMARY OF THE INVENTION

According to the present invention there is provided a seal for sealing between two opposed and generally parallel surfaces, as set out in claim 1.

Such a seal meets the above-described objectives. The support means provides the requisite stiffness, so as to facilitate handling and installation. The sealing layers are able to move independently of the support means during compression and can therefore roll to effect a seal. The result is a highly flexible seal that is well able to cope with differential expansions between sealed surfaces, requires only modest clamping loads, and has built-in compression control. The seal can be self-energizing.

By enabling a rolling (rather than crushing) deformation of the sealing surfaces, sealing can be achieved without galling occurring. Furthermore, the recovery factor is good, and the sealing surfaces are not damaged.

Preferred features of the invention are set out in the claims.

Embodiments of the invention will now be described, by way of example and with reference to the accompanying drawings in which:

BRIEF DESCRIPTION DRAWINGS

FIG. 1 is a plan view of a gasket for use in an exhaust manifold, in accordance with the present invention;

FIG. 2 is a fragmentary enlarged cross-section along the line A—A in FIG. 1;

FIG. 5 is a fragmentary cross-section of a second embodiment of the invention;

FIG. 6 is a fragmentary cross-section of a third embodiment of the present invention;

FIG. 7 is a fragmentary cross-section of a fourth embodiment of the present invention;

Figure 12:
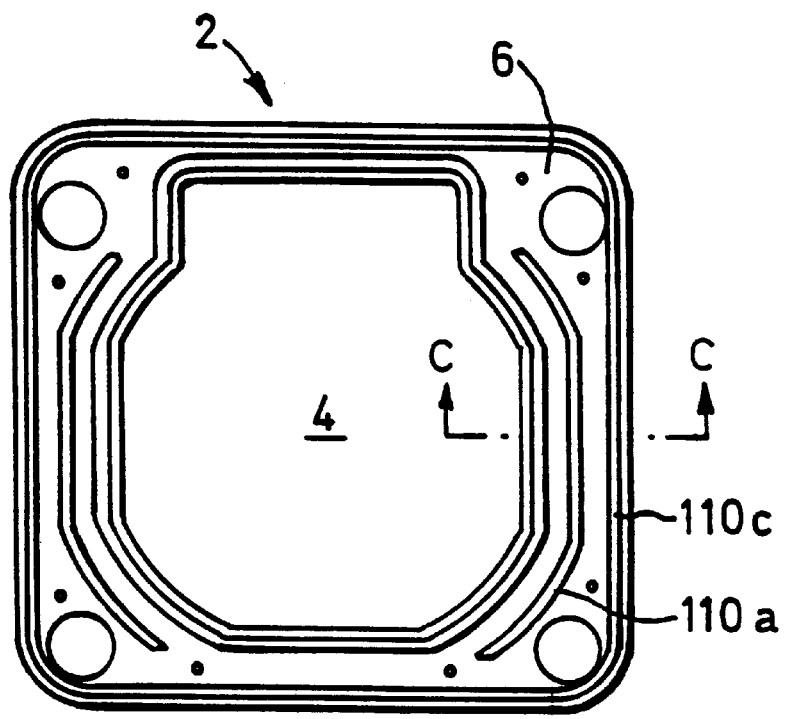
Figure 13:
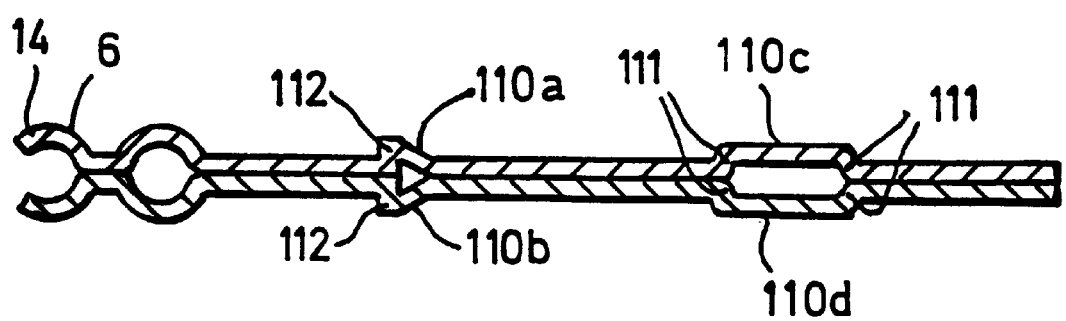

FIG. 8 fragmentary cross-section of a fifth embodiment of the present invention;

FIG. 9 corresponds to FIG. 8, but shows the seal under compression;

FIG. 10 is a fragmentary cross-section of a sixth embodiment of the present invention;

FIG. 11 is a fragmentary cross-section of a seventh embodiment of the present invention;

FIG. 12 is a plan view of a seal according to a ninth embodiment of the invention;

FIG. 13 is a fragmentary cross-section along the line C—C in FIG. 12; and

Figure 14:
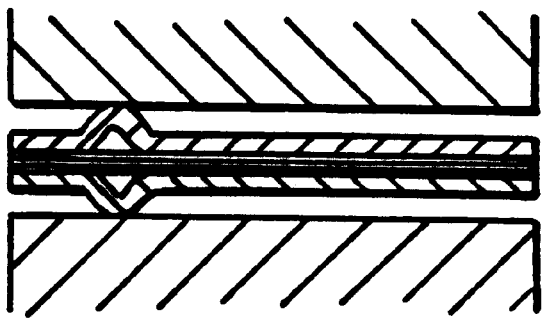
Figure 15:
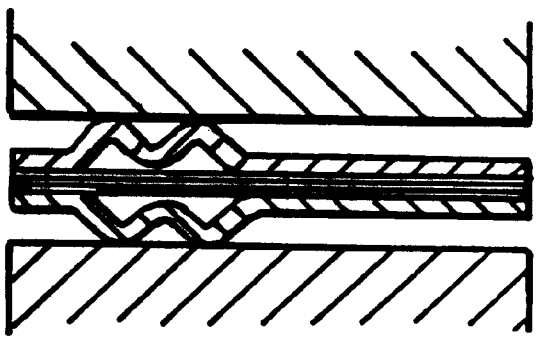
Figure 16:
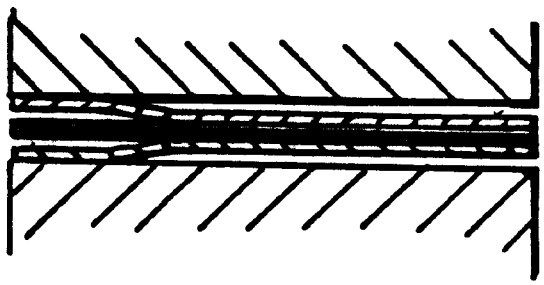

FIGS. 14, 15 and 16 are partial cross-sections of respective known seals.

FIG. 1 shows a gasket (seal) 2 comprising a circular central aperture 4.

DETAILED DESCRIPTION OF THE INVENTION

In use, the gasket 2 is situated between opposed parallel surfaces, to prevent leakage from respective passages which are located on either side and communicate via the aperture 4.

FIG. 2 shows a cross-section along the line A—A of FIG. 1. Referring to this figure, it will be seen that the seal structure is formed from three layers. Outer (sealing) layers 6, 8 are embossed and have sectional profiles which are mirror images of each other in the region of the aperture 4. Each of these outer layers comprises two annular embossments 12, 14, which are each arcuate in cross-section with the same radius of curvature and arranged concentrically. In each layer the radially inner and outer embossments are separated by a respective intermediate flat land 16. The flat lands 16 are in close contact with each other and are firmly pressed together during assembly.

The radially outer embossments 12 are configured such that they, together, generally define an "O"-shaped portion. The radially inner (distal) embossments are truncated, so as to, together, define a generally "C"-shaped portion. To achieve this, each of the distal embossments 14 has an arc of 120°.

The radially outer embossments 12 lead into flat portions 18, which are parallel to the radial plane. The embossments each extend through an arc which is less than 180° from the lands 16. This provides a space between the flat portions 18. This space accommodates the third (intermediate) layer 10.

From FIG. 2, it will clearly be seen that the intermediate layer 10 is substantially thicker than each of the layers 6 and 8. This enables it to provide strength and stiffness to the seal structure, by acting as a support plate. The radially inner edge 20 of the intermediate plate 10 is located on the centre line of the radially outer embossments 12.

In the specific example, the intermediate plate 10 has a thickness of 0.38 mm and each of the outer layers 6, 8 has a thickness of 0.25 mm. The aperture has a diameter of 46 mm. Of course, these dimensions relate only to this example, and in practice the appropriate dimensions for use could be considerably different.

Figure 3:
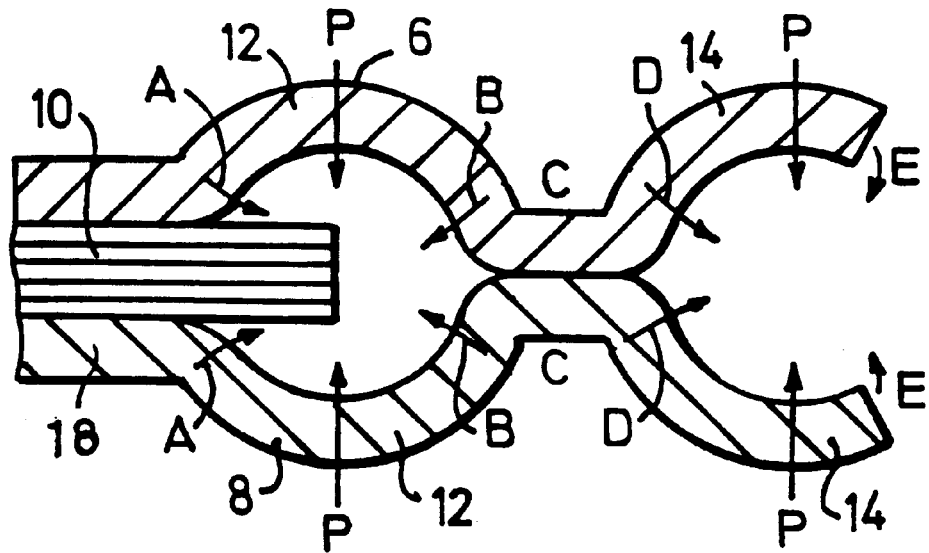
FIG. 3 shows part of the seal of FIGS. 1 and 2 prior to compression.
Figure 4:
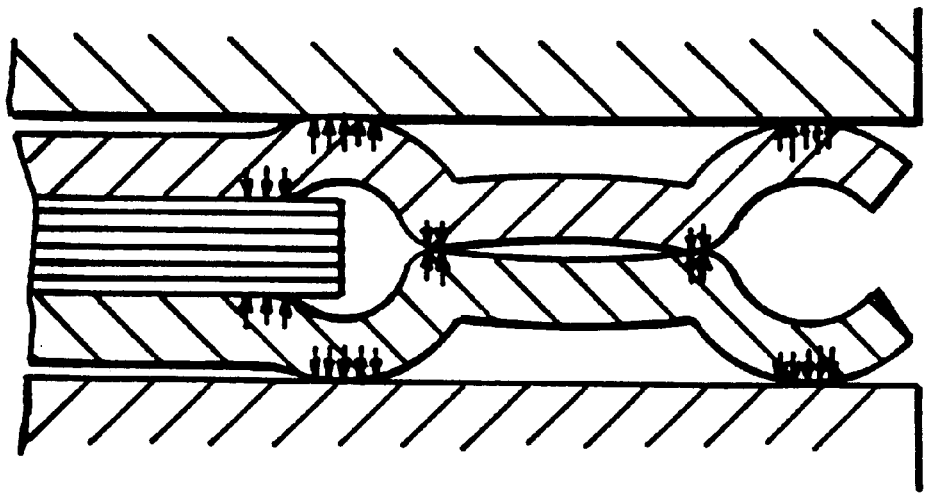
FIG. 4 is a view corresponding to FIG. 3, but showing the seal during compression.

The operation of the seal will now be described in more detail, with particular reference to FIGS. 3 and 4. FIG. 3 shows the loading (P) on the seal just before compression starts. FIG. 4 shows the seal under compression. The arrows in FIG. 4 illustrate the high pressure sealing points of the seal. Comparison of these figures will immediately show that, under compression, the shape of the seal changes considerably. This change in form is a consequence of the various hoop strengths existent in the seal reacting to one another.

From FIG. 4 it can be seen that the radially outer quadrants AA of the O-portion have rolled radially inwardly along the plate 10 under loading. This results from the fact that the flat regions 18 have a greater strength than these quadrants.

Because the lands 16 are firmly pressed against each other, a number of further reactions are ensured. The hoop strength in these lands is such that quadrants BB and DD roll in the directions indicated by respective arrows in FIG. 3 on compression. Similarly, points EE also turn in the direction of the respective illustrated arrows.

The changes in cross-section are, therefore, produced by a multiple rolling action taking place during compression. Consequently, if it became necessary for the clamping studs to be released, a substantial recovery would take place.

As explained above, the radially inner end 20 of the plate 10 extends to the centre line of the "O"-portion. Although it is not crucial that the end portion extends this far, it is highly preferable that it extends beyond the junction of the radially outer ends of the arcuate portions 6 and the flat regions 18. If the middle layer 10 did not do this, it is possible that metal fatigue could cause cracking as a result of fretting occurring on the sharp corner in some applications.

FIG. 5 shows a second embodiment. This has a generally similar construction to the embodiment of FIGS. 2 to 4, but the intermediate plate 10 is replaced by a pair of outer plates 10a and 10b, which serve essentially the same function. To accommodate this, the flat portions 18 are now in direct contact and the radially outer embossments 12 consequently extend through a greater arc of 180°.

FIG. 6 shows a third embodiment, which has a generally similar configuration to the first embodiment. However, it will be noted that the intermediate plate 10 is slightly thinner, the lands 16 are separated by a gap in the uncompressed state and the distal embossments 14 are more flared. In this regard, they extend through an arc of only 90° in the uncompressed state, but extend further in the axial direction than those of the first embodiment. This is achieved by virtue of the fact that they have a greater radius of curvature than those of the previous embodiments.

This seal is intended for use in arrangements where the opposition of the sealing surfaces is very weak—either due to relative thinness of the flanges upon which the sealing surfaces are located, or bolts securing the sealing surfaces together having a small diameter. In such a case, a much lighter clamping load is demanded. Preferably, the mating surfaces would in this case include a high quality of finish—in order to compensate for the lighter clamping load.

FIG. 7 illustrates a fourth embodiment of the invention. This embodiment is generally similar to the embodiment of FIG. 6, but the distal embossments 14 are extended radially inwardly, so as to accommodate a fire ring 22. When the seal is used in automotive applications, the fire ring can be used to prevent the thin metal of the seal becoming incandescent—thereby resisting pre-ignition and improper combustion.

FIG. 8 shows a fifth embodiment of the present invention. In this embodiment, the intermediate layer 10 has a different configuration from the previous embodiments. It comprises a relatively thick radially outer portion 24 and a relatively thin radially inner portion 26. The radially outer portion 24 corresponds in function to the original intermediate layer 10 shown in the previous embodiments. In this regard, it will be noted that it extends to the centre line of the radially outer embossments 12. The thickness of this part is greater than in previous embodiments, to enable the gasket to meet demands for variations in engine compression ratio. This might be required, for example, in order to cope with variations in fuel quality—which vary greatly around the world.

The increase in thickness of the radially outer portion 24 extends the separation between the lands 16. Consequently, the radially inner, thinner portion 26 is included for maintaining control over the rolling movement of the embossments 12 and 14 and lands 16 during loading. In this regard, reference is directed to FIG. 9, which shows the seal during compression.

FIG. 10 shows a further embodiment having general similarity to the embodiment of FIG. 6. However, the middle layer 10 is slightly thicker than the embodiment of FIG. 6 and the distal embossments 14 extend through a slightly greater angle.

FIG. 11 shows a still further embodiment of the invention in which the lands 16 meet at their radially innermost edge and diverge in the radially outward direction. It will be noted that the lands 16 are somewhat wider in this case and that the radius of curvature of the distal embossments 14 is somewhat smaller than in previous embodiments.

FIGS. 12 and 13 show a further embodiment of the invention, which is a variation of the embodiment shown in FIG. 5. The embodiment of FIG. 5 provides a highly effective seal. Where operating conditions are not so demanding, the three-piece seal of FIG. 2 can be used very satisfactorily and has the advantage of saving as much as 25% in material requirements. However, it is obviously highly desirable to reduce manufacturing costs as much as possible. Due to its two-piece construction, the embodiment of FIG. 12 and 13 satisfies this desire most effectively.

In general terms, the embodiment of FIGS. 12 and 13 functions on a similar basis to the embodiment of FIG. 5. However, the plates 10a and 10b of FIG. 5 are omitted. Instead, the layers 6 and 8 are each provided with a pair of embossments 110a, 110c and 110b, 110d, respectively. When seen in cross-section, as in FIG. 13, the embossments provided in each plate are mirror images of those provided in the other.

Situated furthest from the aperture 4 (towards the right of FIG. 13), each layer 6, 8 is provided with an embossment 110c, 110d which has a generally rectangular cross-sectional profile. These embossments 110c, 110d, therefore, include a series of walls 111 which are perpendicular to the opposed faces between which the seal operates. These perpendicular walls operate as struts of very great strength and can thereby control the degree of compression of the seal with high accuracy. The result is that over-compression of the seal can be avoided.

V-shaped or arcuate embossments could be used instead of the rectangular embossments, but these will not provide the same degree of strength. However, because such embossments can be easier to manufacture, it may be desirable to use them where the seal is likely to experience lower compressive loads.

Each layer 6, 8 of the seal also comprises a buttress corrugation 110a, 110b which has a saw-tooth profile in cross-section. These corrugations 110a, 110b, therefore, each define a wall 112, which is perpendicular to the loading faces. Due to their location between the aperture 4 and the rectangular embossments, these corrugations prevent the ballooning (i.e. separating) of the layers 6, 8. This ensures a good sealing effect. If the layers 6 and 8 bowed away from each other in this region, this would cause the distal embossments 14 to tilt towards each other and, thus, away from the opposed faces. This would reduce the sealing effect that the seal could provide between the opposed faces.

In this embodiment, the buttress corrugations 110a, 110b have a saw-tooth profile, because this provides one perpendicular wall 112 in combination with economical manufacture. A perpendicular wall provides a particularly strong resistance to movement. Corrugations having other profiles such as V-shaped or arcuate could be used instead.

Depending upon the application, the position of the embossments can be varied. In certain applications, the strategic positioning of these embossments can lead to a performance that exceeds that of the embodiment of FIG. 5. Indeed, it will be noted from FIG. 16 that the buttress embossments 110a, 110b do not extend around the whole of the aperture. Instead, they are located merely where bowing between the layers 6, 8 is most likely to occur. This has the advantage of an even further saving in raw material.

Whilst two embossments 110a, 110c, 110b, 110d are provided in each layer in this embodiment, it may be desirable to eliminate one or the other of the embossments if either is deemed unnecessary or there is insufficient space to provide both. The arrangement of embossments will depend upon the particular application and particularly, the likelihood of ballooning or over-compression across the seal.

In exceptional circumstances, where extreme pressures are involved and very substantial bolts are required in order to load the sealing surfaces, shims may be inserted inside the embossments, in order to carry the excessively high compression loads.

All of the foregoing embodiments may be made from a range of materials, the selection of which would depend largely upon the desired application.

For example, for a seal for use in automotive applications, all layers may be made from stainless steel. Alternatively, the sealing layers may be made from stainless steel with the support plate or plates (where such are provided) being manufactured from carbon steel.

Stainless steel sealing layers provide good temperature resistance and good spring qualities.

If desired, the seals may have their sealing qualities improved by soft metal, Viton (trade mark) or Nitrile (trade mark) rubber coatings. For example, in order to provide particularly effective sealing properties, both surfaces of the middle layer 10 and the outer surfaces of the outer layers 6, 8 could be coated with Viton (trade mark) and/or Nitrile (trade mark).

Other materials which can be used include high nickel alloys, such as Nimonics (trade. mark) and Inconels (trade mark).

In certain circumstances, it may be desirable for the reliefed section of the seal not to be capable of compression down to a thickness equal to that of the composite layers of metal when flat. By resistance welding a shim of predetermined thickness in strategic positions, such as for example, in bolting regions, compression can be controlled. This can greatly enhance the reflex quality of the seals, particularly in situations where a designer cannot obtain the most desirable gasket bolting patterns.

Occasionally, it is necessary to have a smaller diameter hole in a gasket than that provided in a cylinder head or block. This might be for the purpose of overcoming localised over-heating. To resolve this problem, the embodiment of FIG. 6 can be employed and the middle layer 10 can be extended through the sealing section so as provide the requisite radial dimension.

If any of the foregoing seals is to be used in food applications, a wire or PTFE ring can be inserted between the distal embossments in order to prevent food becoming trapped within the seal.

It is, of course, to be understood that the present invention can be applied to a vast range of seals and gaskets for use in a wide variety of applications. These will include, inter alia, single and multi-aperture gaskets and seals for sealing apertures having other than circular shapes including those having irregular shapes.

Many further modifications and variations will become manifest to those versed in the art upon making reference to the foregoing illustrative embodiments, which are given by way of example only and which are not intended to limit the scope of the invention, which is defined by the appended claims.

What is claimed is:

1. A self-energizing seal for sealing between two opposed and generally parallel surfaces, comprising support means for location between said opposed surfaces and further comprising a pair of opposed sealing layers supported by the support means and extending beyond a lateral edge region of the support means into a sealing region for effecting a seal between said opposed surfaces when said seal is located therebetween, wherein the sealing layers together define a first channel which is open along one side such that any pressurized fluid entering between the sealing layers urges them apart and against the opposed surfaces, in such a manner that the fluid is contained within said channel and the sealing contact between the opposed surfaces and the sealing layers is enhanced, wherein a respective portion of each of the sealing layers comprises an embossment, the embossments together supporting said first channel and wherein the embossments are opposed and configured such that they, together, define a second channel, the volume of the voids within said first channel and within said second channel remaining substantially unchanged under loading of the seal.

2. A seal according to claim 1, wherein each of the embossments has an arcuate profile, when viewed in a cross-section taken along a direction in which the sealing layers project into the sealing region.

3. A seal according to claim 2, wherein each of the arcuate profiles is part-circular prior to loading.

4. A seal according to claim 3, wherein said edge of the support layer is disposed substantially on a center-line of said second channel prior to loading of the seal.

5. A seal according to any one of claims 3 to 4, wherein each of the embossments has a different radius of curvature.

6. A seal according to claim 5, wherein an end portion of a first of the embossments having a relatively larger radius of curvature partially encircles an end portion of a second of the embossments having a relatively smaller radius of curvature prior to loading, the arrangement being such that the second embossment can move within the first embossment upon loading.

7. A seal according to claim 6, wherein the arrangement is such that the second embossment is urged to roll within the first embossment upon loading.

8. A seal according to claim 6, wherein the first embossment is configured such that its end portion is directed substantially perpendicular to the said opposed surfaces during loading.

9. A seal according to claim 8, wherein the end portion of the first embossment is adapted to abut one of the opposed surfaces during loading.

10. A seal according to any one of claims 1, 2, 3 or 4, wherein each sealing layer further comprises a distal embossment located further from the support layer than said embossment, said distal embossments together defining said first channel.

11. A seal according to claim 10, wherein each of the said distal embossments has an arcuate profile, when viewed in the said cross-section.

12. A seal according to claim 11, wherein said arcuate profiles of each of the distal embossments has a portion which is part-circular prior to loading.

13. A seal according to claim 12, wherein the part-circular portion of each distal embossment has an arc of substantially 120° prior to loading.

14. A seal according to claim 12, wherein the part-circular portion of each distal embossment has an arc of substantially 90° prior to loading.

15. A seal according to claim 12, wherein each distal embossment has a radius of curvature which is substantially the same as that of the said embossment located on the respective sealing layer.

16. A seal according to claim 12, wherein the radius of curvature of each said distal embossment is greater than that of the said embossment located in its respective sealing layer.

17. A seal according to claim 12, wherein the radius of curvature of each said distal embossment is smaller than that of the said embossment located in its respective sealing layer.

18. A seal according to claim 11, wherein each distal embossment comprises a straight portion extending from a distal end of the distal embossment in a direction substantially parallel to the said opposed surfaces prior to loading.

19. A seal according to claim 12, wherein each sealing layer comprises a land interposed between the embossment and the distal embossment.

20. A seal according to claim 19, wherein the lands have respective flat surfaces, which are mutually opposed.

21. A seal according to claim 20, wherein the flat surfaces are substantially mutually parallel and substantially parallel to the said opposed surfaces to be sealed prior to loading.

22. A seal according to claim 21, wherein the lands are arranged to be in mutual contact prior to loading.

23. A seal according to claim 20, wherein the said flat surfaces of the lands diverge from each other, in a direction extending from the sealing region towards the support layer, prior to loading.

24. A seal according to claim 19, wherein the lands are separated by a gap prior to loading.

25. A seal according to claim 1, wherein the sealing layers are mutually symmetric about a line of symmetry substantially parallel to said opposed surfaces.

26. A seal according to claim 1 wherein the support means comprises a support layer, interposed between the sealing layers.

27. A seal according to claim 26, wherein the support layer has a first relatively thick portion, which extends in a direction generally parallel to the said opposed surfaces, to a point located between the said embossments; and a second, relatively thin portion, which extends from the said point to distal end regions of the said embossments.

28. A seal according to claim 1, wherein the support layer has a first relatively thick portion, which extends in a direction generally parallel to the said opposed surfaces, to a point located between the said embossments; and a second, relatively thin portion, which extends from the said point to distal end regions of the said embossments.

29. A seal according to claim 1 wherein the support means comprises a pair of substantially parallel support layers, wherein the said sealing layers are interposed between the support layers.

30. A seal according to claim 1, wherein the support means comprises a pair of support layers, each support layer being integrally formed with a respective one of the said sealing layers.

31. A seal according to claim 30, wherein at least one of the said support layers comprises a support embossment for resisting over-compression of the seal by the said opposed surfaces during loading.

32. A seal according to claim 31, wherein each of the said support layers comprises a said support embossment, the said supporting embossments being opposed and generally symmetrical about a plane extending generally parallel to and between the opposed surfaces when the seal is in position for use.

33. A seal according to claim 31 or 32, wherein the or each support embossment has a generally rectangular profile when viewed in cross-section.

34. A seal according to claim 31 or 32, wherein the or each said support embossment has a generally arcuate profile when viewed in cross-section.

35. A seal according to claim 31 or 32, wherein the or each said support embossment has a generally V-shaped profile when viewed in cross-section.

36. A seal according to any one of claims 31 or 32, wherein a shim is situated inside the support embossment or at least one of the support embossments.

37. A seal according to claim 30, wherein at least one of the said support layers further comprises a buttress embossment for bearing against one of the said opposed surfaces during use, thereby to resist separation of the said support layers.

38. A seal according to claim 37, wherein each of the said support layers comprises a said buttress embossment, the said buttress embossments being opposed and generally symmetrical about a plane extending generally parallel to and between the opposed surfaces when the seal is in position for use.

39. A seal according to claim 37, or 38, wherein the or each buttress embossment has a generally saw-toothed profile when viewed in cross-section.

40. A seal according to claim 37 or 38, wherein the buttress embossment or at least one of the said buttress embossments comprises a shim situated therein.

41. A seal according to claim 1, comprising a blocking member situated between the said sealing layers, for preventing matter from entering therebetween.

42. A seal according to claim 41, wherein the blocking member is a length of wire or PTFE.

43. A seal according to claim 10, further comprising a fire resistant layer interposed between the distal embossments.

* * * * *